(12) United States Patent
Kehoe et al.

(10) Patent No.: US 7,586,065 B2
(45) Date of Patent: Sep. 8, 2009

(54) ELECTRIC COOKER

(76) Inventors: Paul M. Kehoe, 563 Reynolds Street, Whitby, Ontario (CA) L1N 6H6; Daniel P. Kehoe, 59 Teresa Drive, Whitby, Ontario (CA) L1N 6H9

( * ) Notice: Subject to any disclaimer, the term of this patent is extended or adjusted under 35 U.S.C. 154(b) by 285 days.

(21) Appl. No.: 11/602,504

(22) Filed: Nov. 21, 2006

(65) Prior Publication Data

US 2008/0118614 A1 May 22, 2008

(30) Foreign Application Priority Data

Nov. 17, 2006 (CA) .................................. 2568468

(51) Int. Cl.
*H05B 1/02* (2006.01)
(52) U.S. Cl. ........................ 219/497; 219/492; 219/432; 219/435; 219/441; 392/441; 99/328
(58) Field of Classification Search .................. 219/491, 219/494, 497, 499, 501, 505, 506, 508, 432–434, 219/429, 441; 392/441; 426/231; 99/325–331
See application file for complete search history.

(56) References Cited

U.S. PATENT DOCUMENTS

| | | | | |
|---|---|---|---|---|
| 3,788,302 | A * | 1/1974 | Malaney et al. | 126/374.1 |
| 5,313,876 | A * | 5/1994 | Hilger et al. | 99/330 |
| 5,609,093 | A * | 3/1997 | Hohler et al. | 99/408 |
| 5,974,955 | A * | 11/1999 | King et al. | 99/407 |
| 6,283,014 | B1 * | 9/2001 | Ng et al. | 99/330 |

\* cited by examiner

Primary Examiner—Mark H Paschall

(57) ABSTRACT

A device for cooking food is disclosed. The device has an elongated body for containing the food to be cooked with a heater at one end and a simmer temperature sensor at the other end. The heater initially brings the substance contained in the elongated member to a boil which is sensed by a boiling sensor. The boiling temperature sensor may be integral with the heater. Once a controller connected to the heater receives a signal from the boiling sensor indicating that the substance is boiling, the controller alternates the power to the heater between a simmer power level and a non-simmer power level which is lower than the simmer power level. The controller controls the power level of the heater in response to a signal from the simmer temperature sensor. The simmer temperature sensor sends a signal to the controller when the temperature of the substance at the end remote from the heater falls below a predetermined simmer temperature. In response to receiving the simmer signal, the controller sends the simmer power level so that the heater will heat the substance at the simmer power level. When the simmer temperature sensor senses that the temperature of the substance has risen above the simmer temperature, the simmer temperature sensor will discontinue sending the simmer signal. In response to the discontinuance of receiving the simmer signal to the controller, the controller will send a power level signal to the heater to apply a non-simmer power level to the heater which is lower than the simmer power level. The device is particularly well suited for cooking pasta because the elongated shape of some pasta is easily accommodated in the elongated body, but the elongated body can be used to cook any other types of foods including vegetables and soups.

17 Claims, 8 Drawing Sheets

ELECTRIC COOKER

FIELD OF THE INVENTION

This invention relates to the field of electric cookers. More particularly, this invention relates to the field of electric cookers which simmer food for a period of time.

BACKGROUND OF THE INVENTION

In the past, there have been many different types of electric cookers having various shapes and functions. However, by and large, the electric cookers have had a rounded shape to permit even heating of the substance in the cooker.

In some cases, elongated electric cookers have been developed in the past. However, these have suffered from the disadvantage that heat cannot be evenly disbursed amongst the entire elongated container. Furthermore, to the extent that these heaters have had sensors to determine whether or not the substance in the container is being heated, is boiling and/or, for safety reasons, is not overheating, the sensors have been located at the bottom of the container and often near or on the heater. Therefore, by and large, the prior art devices suffer from the disadvantage that the sensors are all located generally at the bottom of the container and more generally near the heater or integrally formed with the heater, and therefore no information is available regarding the substance being cooked at locations remote from the heater.

SUMMARY OF THE INVENTION

Accordingly, it is an object of this invention to at least partially overcome some of the disadvantages of the prior art. Also, it is an object of this invention to provide an improved type of electric cooker.

In a further aspect, the present invention provides for a device wherein water is added to the elongated unit and is subsequently heated. When the water reaches the boiling point, an audible signal is generated indicating that the boiling point has been reached. The substances to be boiled are then added, which may include seasoning and/or pasta. The user of this device knows that the water has reached a boiling point when an audible signal is sent from an audible indicator. The pasta is then cooked for a predetermined time.

The simmer temperature is preferably between 80° C. and 99° C. More preferably, the simmer temperature is between 80° C. and 90° C. and still more preferably at a simmer temperature of 85° C.

The elongated device also has a strainer at the first end of the elongated member and a cover at the first end of the elongated member. At the end of the predetermined time, water can easily be strained from the elongated member by removing the cover and keeping the strainer in place. The strainer can be removed once the water has been drained in order to remove the cooked substance, such as pasta.

The elongated member simmer sensor, the heater and the boiling temperature sensor are included in a first integral unit and a controller input unit and the power source are included in a second integral unit. These two integral units may be connected together by a quick release. The quick release connection has contacts which are circular and permit rotation of the first integral member with respect to the second member.

In still further aspect, the present invention provides for a display on the input unit on the second integral unit that allows the user to operate the device and input the predetermined time. The heater also has a manual safety temperature sensor.

In a further aspect, the present invention provides a device for cooking a substance, said device comprising:

an elongated member having a first end and a second end, opposed from the first end, for containing the substance;

a simmer sensor located near the first end of the elongated member for sending a simmer signal if the simmer sensor senses a decrease in temperature near the first end below a simmer temperature;

a heater located at the second end for heating the substance at different power levels;

a controller for receiving signals including the simmer signal and sending power level signals to the heater; and wherein once the substance is at a predetermined temperature, which is higher than the simmer temperature, the simmer sensor senses the temperature at the first end remote from the second end and sends the simmer signal to the controller if the temperature of the substance falls below the simmer temperature, and, in response to receiving the simmer signal, the controller sends a simmer power level signal to the heater to cause the heater to heat the substance at a simmer power level.

In a still further aspect, the present invention provides a method for cooking a substance, said method comprises:

placing the substance in an elongated member, said elongated member having a first end and a second end opposed from the first end, and, a heater for heating the substance at different power levels at the second end;

sensing a temperature of the substance near the second end;

sending a simmer signal to a controller if the temperature sensed near the first end decreases below a simmer temperature; and, in response to receiving the simmer signal, the controller sends a simmer power level signal to the heater to cause the heater to heat the substance at a simmer power level.

In a further aspect, the present invention provides system for cooking a substance, said system comprising:

a first integral unit comprising:

an elongated member having a first end and a second end, opposed from the first end, for containing the substance;

a simmer sensor located near the first end of the elongated member for sending a simmer signal if the simmer sensor senses a decrease in temperature near the first end below a simmer temperature;

a heater located at the second end for heating the substance at different power levels;

a second integral unit comprising:

a controller for receiving signals including the simmer signal and sending power level signals to the heater;

a quick release for connecting the first integral unit to the second integral unit;

wherein once the substance is at a predetermined temperature, which is higher than the simmer temperature, the simmer sensor in the first integral unit senses the temperature at the first end remote from the second end and sends the simmer signal to the controller in the second integral unit if the temperature of the substance falls below the simmer temperature, and, in response to receiving the simmer signal, the controller sends a simmer power level signal in the first integral unit to the heater to cause the heater to heat the substance at a simmer power level; and wherein, one the substance is cooked, the first integral unit can be separated from the second integral unit to facilitated removal of the substance from the elongated member.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 2:
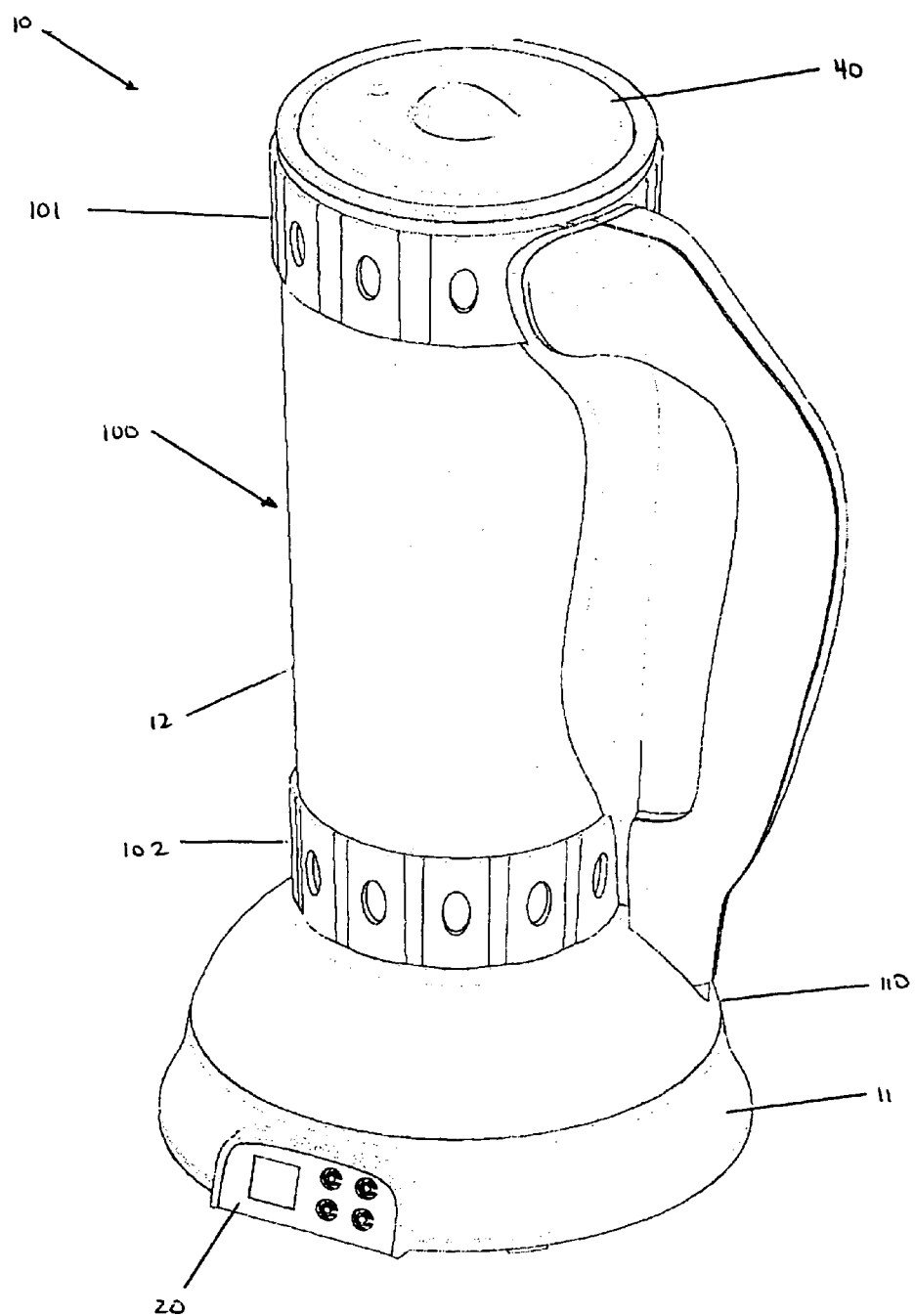
FIG. 2 is a drawing illustrating the present invention according to one embodiment.

FIG. 2 is a perspective view of one embodiment of an electric cooker device 10. The device 10 is comprised of a first integral unit 12 and a second integral unit 11. The first integral unit 12 has an elongated member 100 which has a first end 101 and a second end 102 which is opposed from the first end 101. As shown in FIG. 2, the elongated member 100 preferably comprises a hollow cylindrical shaped device. The elongated member 100 is designed to hold substances that are to be heated. In a preferred embodiment, the device 10 and, in particular, the elongated member 100 is particularly well-suited for cooking pasta because the elongated shape of some pasta is easily accommodated in the elongated body 100. However, the device 10 can also be used to cook any other foods, for example, vegetables and soups. Attached to the second end 102 of the elongated member is a heater 110. The heater 110 is designed to heat the substances at different power levels. FIG. 2 shows the heater 110 contained within a flared base at the second end 102 of the elongated member 100.

Figure 1:
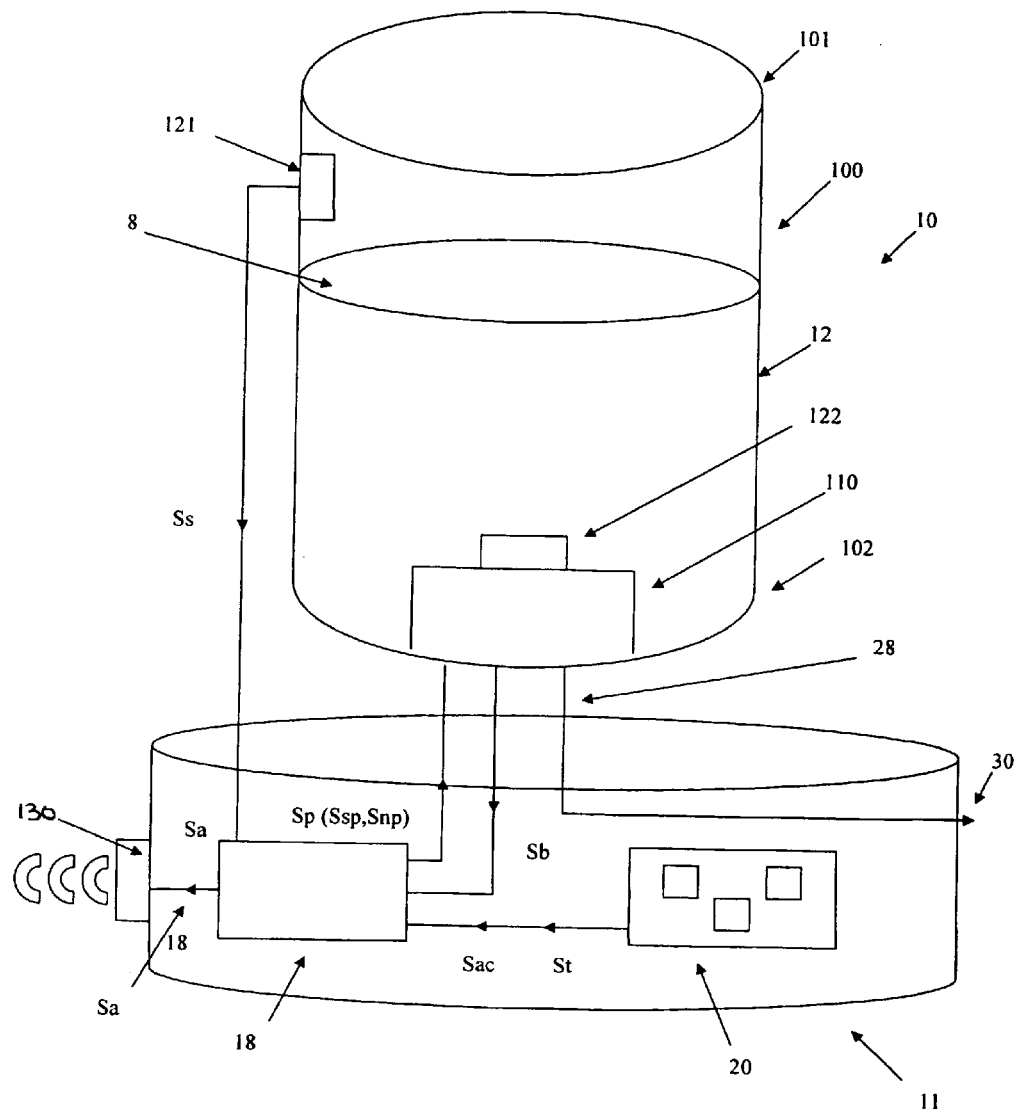
FIG. 1 is a schematic diagram showing components of the device according to one embodiment of the present invention.

FIG. 1 is a schematic diagram illustrating how each of the different features of the device 10 work together. The elongated member 100 has a simmer sensor 121 located at the first end 101 of the elongated member 100. The elongated member 100 also has a heater 110 at the second end 102 of the elongated member 100. Preferably, the simmer sensor 121 is located at an end opposed from the heater 110 so that the temperature of the substance 8 is being sensed, not just the temperature of the substance 8 located near the heater 110.

As shown in FIG. 1, the elongated member 100 contains a substance 8 which is to be heated by the device 10. The substance 8 may, for example, be water with pasta in it wherein the pasta is being coked by the device.

When the first integral unit 12 is attached to the second integral unit 11 the simmer sensor 121 is able to send a simmer signal Ss to a controller 18. Preferably, the controller 18 may be an integral circuit (not shown). More preferably, the controller 18 is a Strix™ controller. The Strix controller being manufactured by Strix Ltd.

The simmer sensor 121 located near the first end 101 of the elongated member 100 is for sending a simmer signal Ss to the controller 18 if the simmer sensor 121 near the first end senses a decrease in temperature below a simmer temperature.

Figure 9:
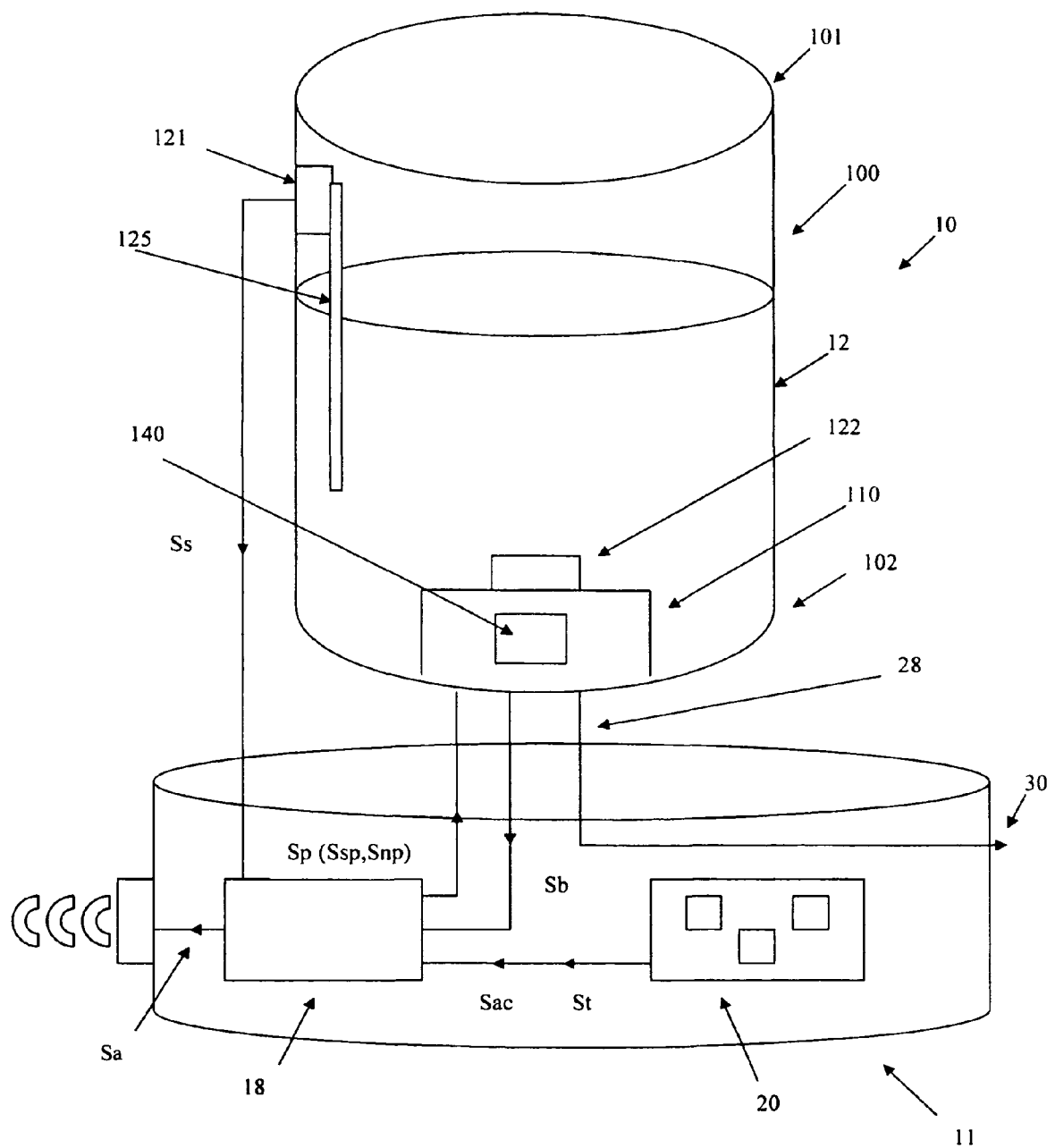
FIG. 9 is a drawing illustrating the present invention according to a further embodiment.

In a further aspect, the simmer sensor 121 may be a probe extending into the substance closer to the first end 101 than the second end 102 of the elongated member 100 as shown in FIG. 9.

The controller 18 may receive signals, including the simmer signal Ss, and may send power level signals Sp to the heater 110 in response to the signals received. The heater 110 is located at the second end 102 for heating the substance 8 at different power levels.

In a preferred embodiment, once the substance is at a predetermined temperature, which is higher than the simmer temperature, the simmer sensor 121 senses the temperature at the first end 101 remote from the second end 102 and sends the simmer signal Ss to the controller 18 if the temperature of the substance 8 falls below the simmer temperature. In response to receiving the simmer signal Ss, the controller 18 sends a simmer power level signal Sp to the heater 18 to cause the heater 18 to heat the substance 8 at a simmer power level. In one preferred embodiment the predetermined temperature which is higher than the simmer temperature may be the boiling temperature of the substance 8 in the elongated member 100.

In a further embodiment, once the simmer sensor 121 senses that the temperature at the first end 101 rises above the simmer temperature, the simmer sensor 121 discontinues sending the simmer signal Ss to the controller 18. In response to not receiving the simmer signal Ss, the controller 18 sends a non-simmer power level signal to the heater 18 causing the heater 18 to heat the substance 8 at a non-simmer power level, lower than the simmer power level. In a still further embodiment, the non-simmer power level signal is a zero power level indicating that no power is sent to the heater 18 to heat the substance 8.

The boiling point sensor 122 may be located at the second end 102 of the elongated member 100 to send a boiling signal Sb to the controller 18 when the substance 8 is boiling. The boiling point sensor 122 may be is integrally formed with the heater 100. When the boiling point sensor 122 senses that the substance 8 is boiling, the heater 110 sends the boiling signal Sb to the controller 18. The Strix controller may also comprise a boiling point sensor 122 near or associated with the heater 110.

For example, if the simmer sensor 121 detects that the substance 8 is at a predetermined temperature, which is higher than the simmer temperature, the simmer sensor 121 no longer sends a simmer signal Ss to the controller 18. The controller 18 can then reduce the power level signal Sp sent to the heater to reduce the heat being added to the substance by the heater. The power level signal Sp may be reduced to 0 indicating that no power is sent to the heater to heat the substance.

However, if the simmer sensor 121 senses that the temperature of the first end falls below the simmer temperature, the simmer sensor 121 will send a simmer signal Ss to the controller 18. The controller 18 then sends a power level signal Sp to the heater 110 to cause the heater 110 to increase the heat on the substance 8.

In a further embodiment, the second integral unit 11 has an input unit 20 that can send an activation signal Sac and a predetermined time signal St to the controller 18. The activation signal Sac indicates activation of the device and the predetermined power level signal St indicates the time in which the substance is to be simmered. The input unit 20 can send the activation signal Sac to the controller 18 and, in response to the controller 18 receiving the activation signal Sac, the controller 18 sends a power level signal Sp to the heater 110 to cause the heater 110 to heat the substance 8 to boiling. When the substance 8 reaches boiling, the boiling point sensor 122 senses the boiling temperature and sends a boiling signal Sb to the controller 18. Once the controller 18 receives this boiling point signal Sb, the controller 18 sends a simmer power signal Ssp or non-simmer power level signal Snp to the heater 110 based on the signal received from the simmer sensor 121. The simmer power level signal Ssp or non-simmer power level signal Snp is maintained for the period of time corresponding to the predetermined time signal St sent from the input unit 20.

In a still further embodiment, in response to the controller 18 receiving the boiling point signal Sb, the controller 18 sends an audible signal Sa to an audible indicator 3. The audible indicator generates an audible sound to alert the user that the boiling point has been reached. The controller 18 will send the audible signal Sa to the audible indicator either when it receives boiling signal Sb or the end of the time period corresponding to the predetermined time signal St. For example, if the initial substance is water, upon the water reaching the boiling point, seasoning and pasta may be added to the water in response to an audible signal being heard and cooked for a predetermined time period.

Figure 3:
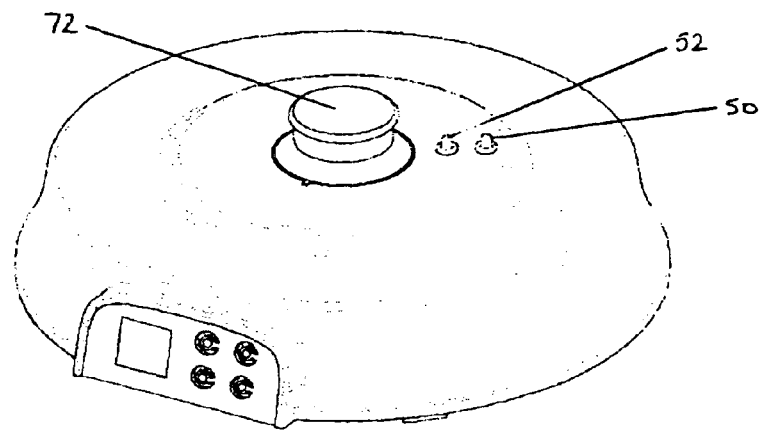
FIG. 3 is the base integral component according to one embodiment.

FIG. 3 is a perspective view of the second integral unit 11. FIG. 3 additionally shows the input unit 20 that sends the activation signal Sac and predetermined time signal St to the controller 18. In this embodiment, the second integral unit 11 is designed as circular base with two wires 50 and 52 that extend above the second integral unit 11. These wires 50 and 52 engage two concentric circular contacts 60 and 62 on the base of the first integral unit 12 shown in FIG. 8. In a further embodiment these wires 50 and 52 may be depressable first and second sensor contacts 50 and 52, respectively. The first and second contacts 50 and 52 connect to the two concentric circular contracts 60 and 62, respectively, to provide the connection between the simmer sensor 121 in the first integral unit 12 with the controller 18 in the second integral unit 11.

Figure 8:
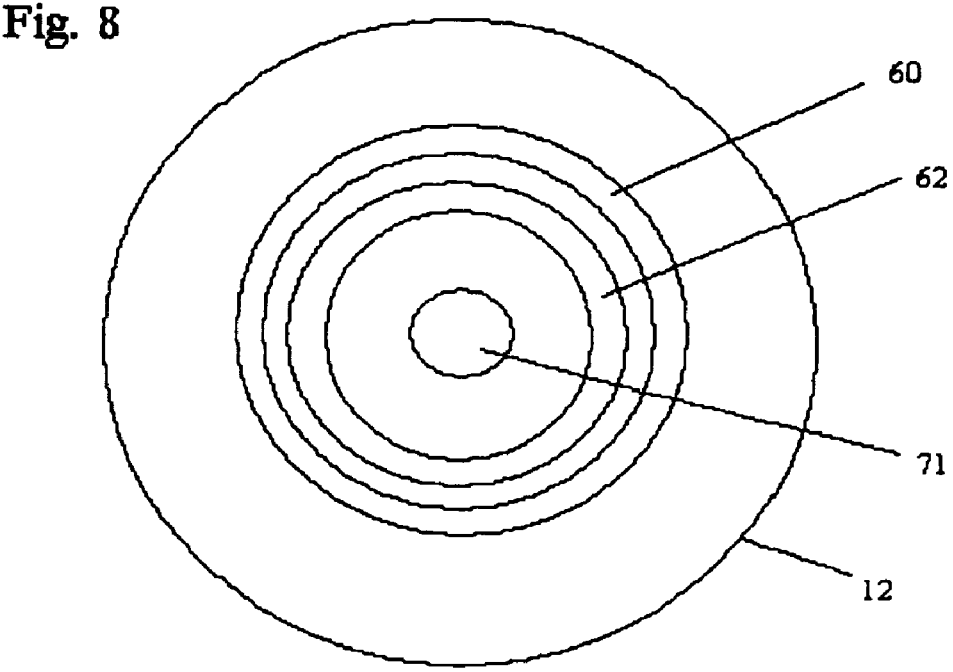
FIG. 8 is a bottom view of the first integral unit.

FIG. 3 also shows a second Strix connection 72. FIG. 8 shows a first Strix connection 71. The first Strix connection 71 connects to the second Strix connection 72 to pin the first integral unit 12 to the second integral unit 11.

The first and second Strix connections 71 and 21, along with the first and second sensor contacts 50 and 52 and the two concentric circular contacts 60 and 62 can form a quick release from the first integral unit 12 to the second integral unit 11. Furthermore, in a further embodiment the first integral unit 12 is able to rotate with respect to the second integral unit 11.

In a further embodiment, the elongated member 100, simmer sensor 121, heater 110 and the boiling point sensor 122 form a first integral unit 12. The controller 18, input unit 20 and a power source form the second integral unit 11.

In one embodiment, the device 10 includes at least three sensors including the simmer sensor 121, boiling point sensor 122, which is part of the Strix sensor and a safety sensor 140. The manual safety sensor 140 may be a mechanical or electric safety sensor having a fail safe built into it, such as a fuse. The manual safety sensor is provided to protect against overheating and fire.

Figure 4A:
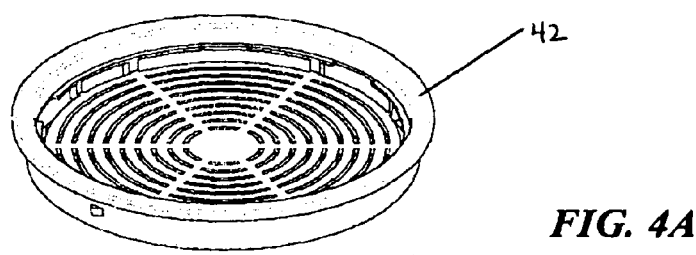
FIG. 4A, FIG. 4B, and FIG. 4C show components for on embodiment of the present invention.
Figure 4B:
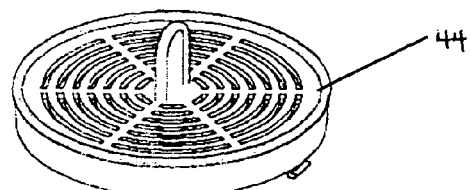

FIG. 4A and FIG. 4B show perspective views of different strainers that can be used to permit water to exit the elongated member 100 in order to strain the substance being boiled, for example, pasta. The substance being boiled or heated may also include vegetables or soup. In a preferred embodiment, at the end of the predetermined time water can be strained using the strainer of the elongated member 100 and then the strainer removed to facilitate removal of the cooked pasta or other food. In one embodiment, the strainer 44 shown in FIG. 4B can fit within strainer 42 in FIG. 4A.

Figure 4C:
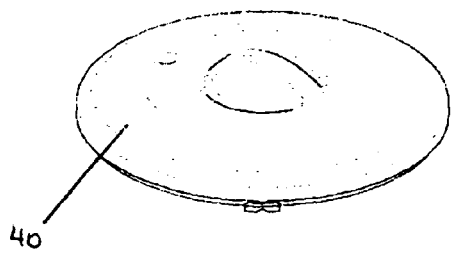

FIG. 4C shows a cover 40. The cover 40 is used to seal the top of the elongated member during heating and can also be sealed to the top of the strainers 42 and 44 to allow for their easy removal from the elongated member 12.

Figure 5:
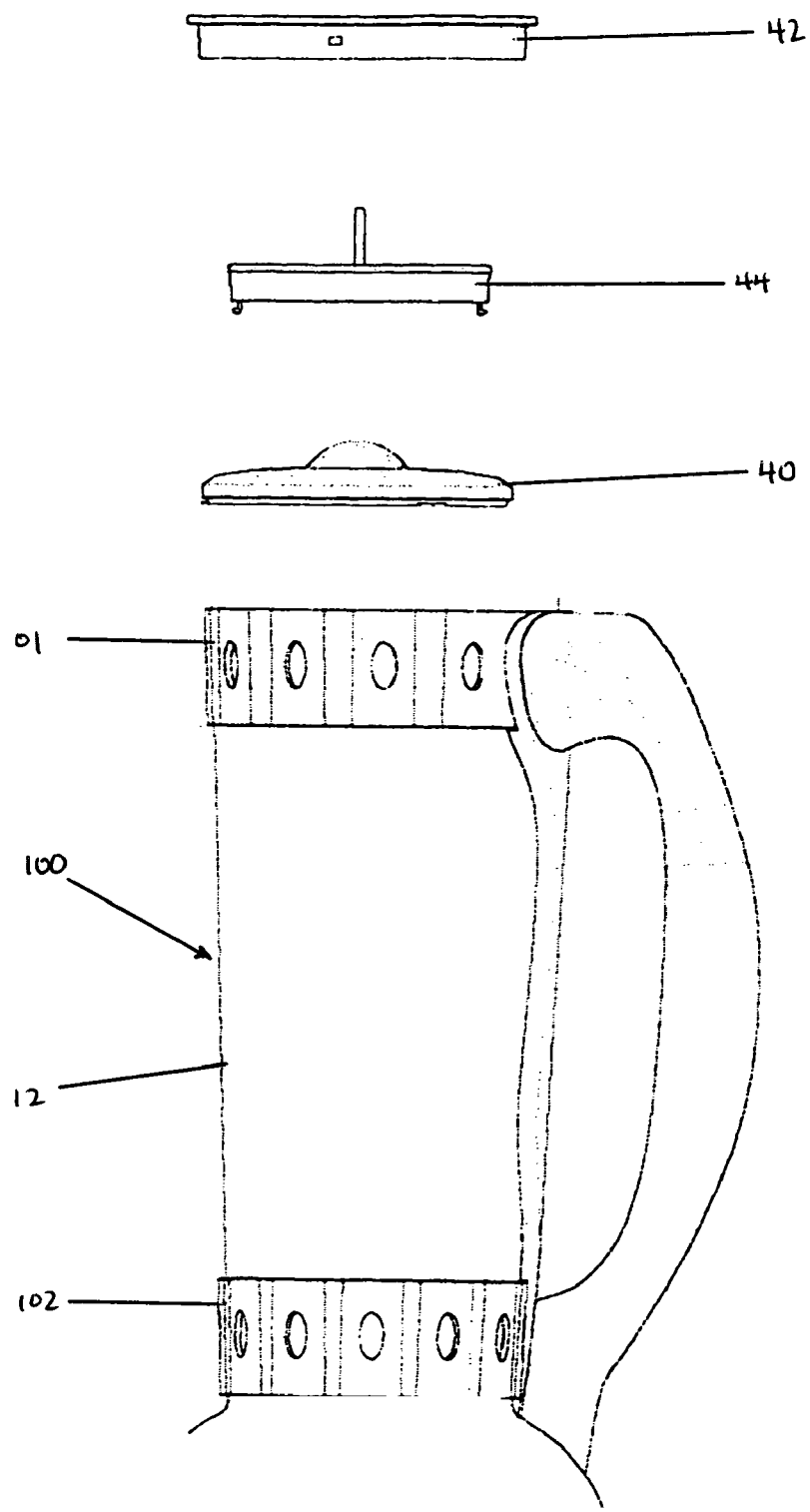
FIG. 5 is a disassembled view of the first integral unit according to one embodiment of the present invention.
Figure 6:
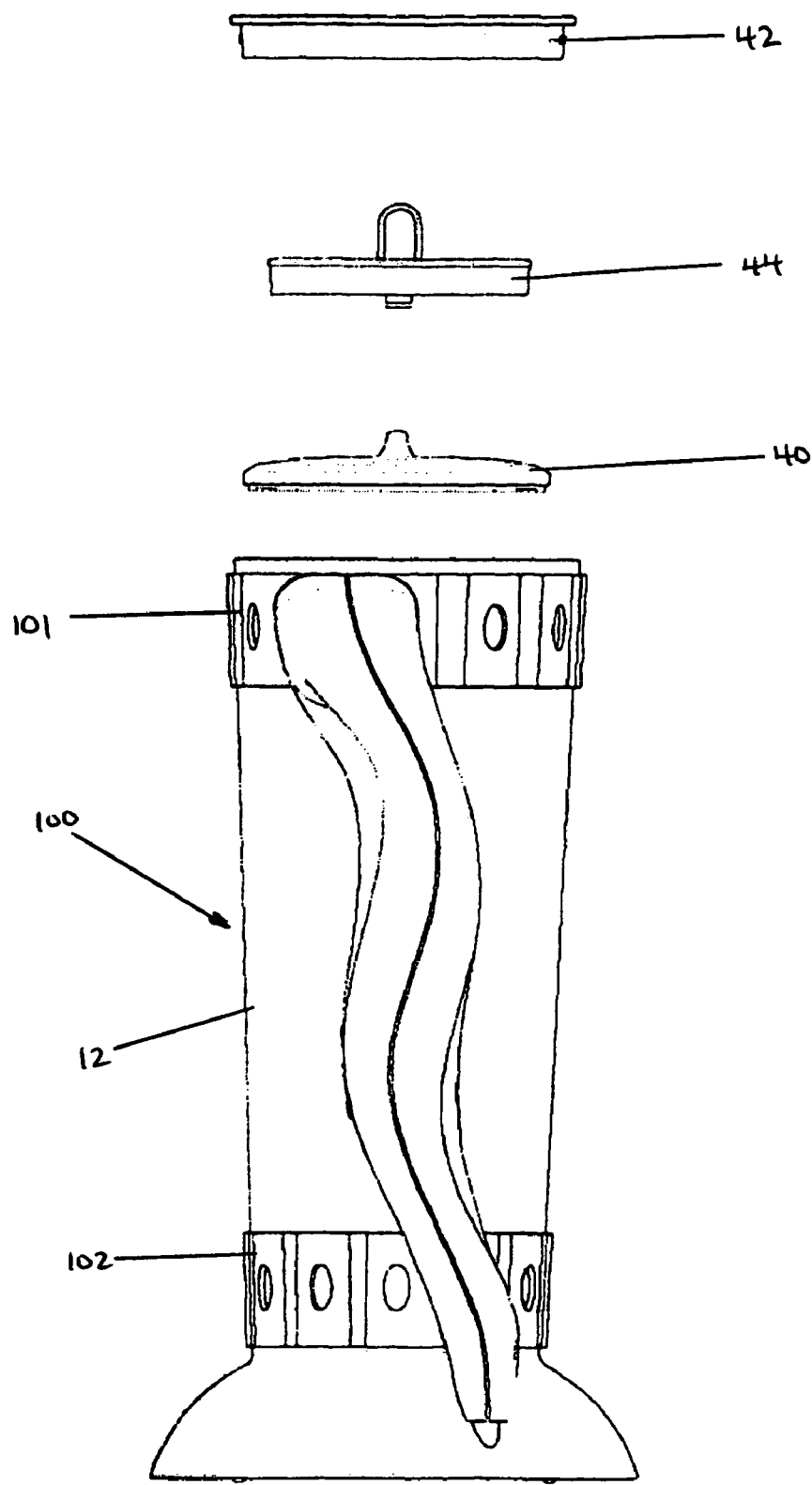
FIG. 6 is a side view of FIG. 5.
Figure 7:
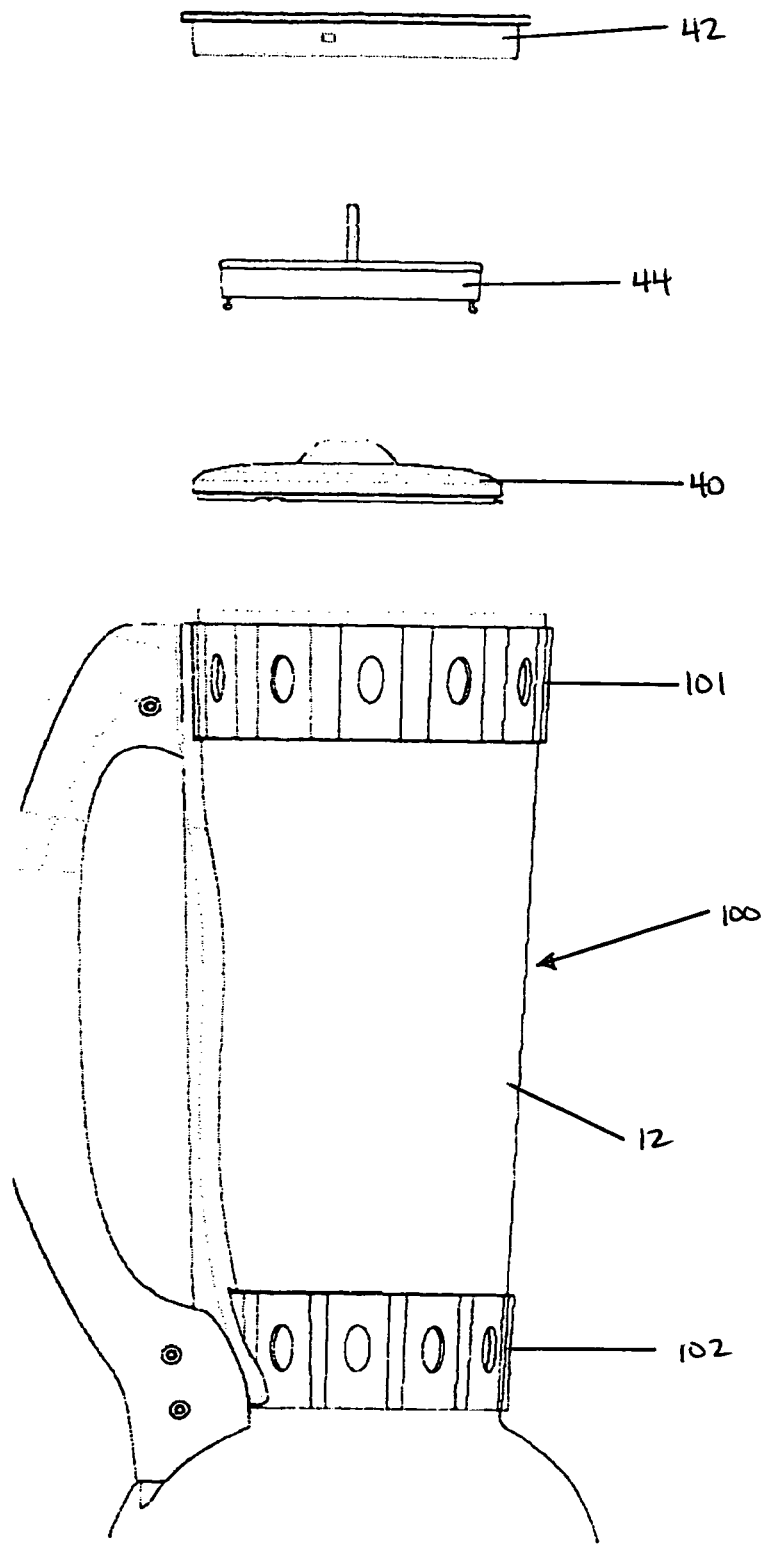
FIG. 7 is a further side view.

FIGS. 5, 6 and 7 show the first integral unit 12 with each of the strainer 42, strainer 44 and cover 40, shown from different angles.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions", the specification may be used to evidence the appropriate ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A device for cooking a substance, said device comprising:
   an elongated member having a first end and a second end, opposed from the first end, for containing the substance;
   a simmer sensor located near the first end of the elongated member for sending a simmer signal if the simmer sensor senses a decrease in temperature near the first end below a simmer temperature;
   a heater located at the second end for heating the substance at different power levels;
   a boiling point sensor to send a boiling point signal to the controller when the substance is boiling;
   a controller for receiving signals including the simmer signal and sending power level signals to the heater;
   wherein once the substance is at a boiling temperature, which is higher than the simmer temperature, the simmer sensor senses the temperature at the first end remote from the second end and sends the simmer signal to the controller if the temperature of the substance decreases below the simmer temperature, and, in response to receiving the simmer signal, the controller sends a simmer power level signal to the heater to cause the heater to heat the substance at a simmer power level and wherein once the simmer sensor senses that the temperature at the first end increases above the simmer temperature, the simmer sensor discontinues sending the simmer signal to the controller, and, in response to not receiving the simmer signal, the controller sends a non-simmer power level signal to the heater causing the heater to heat the substance at a non-simmer power level, lower than the simmer power level.

2. The device as defined in claim 1 wherein the non-simmer power level signal is a zero power level indicating that no power is sent to the heater to heat the substance.

3. The device as defined in claim 1 wherein the boiling point sensor is integrally formed with the heater; and wherein the heater sends the boiling signal to the controller when the boiling point sensor senses that the substance is boiling.

4. The device as defined in claim 1 further comprising:

an input unit for sending an activation signal, indicating activation of the device, and a predetermined simmer time signal, indicative of the time the substance is to be simmered, to the controller; and wherein, upon activation, the input unit sends the activation signal to the controller, and, in response to the controller receiving the activation signal, the controller sends a boil power level signal to the heater to cause the heater to heat the substance to boiling; and wherein once the controller receives the boiling point temperature signal, the controller sends the simmer power level signal and non-simmer power level signal to the heater based on the simmer signal from the simmer sensor for a period of time corresponding to the predetermined simmer time signal.

5. The device as defined in claim 4 further comprising:

an audible indicator for generating an audible sound in response to receiving an audible signal from the controller; and wherein the controller sends the audible signal to the audible indicator at one or more of receipt of the boiling signal or end of the time period corresponding to the simmer time signal.

6. The device as defined in claim 1 wherein the simmer sensor is a probe extending into the substance closer to the first end than the second end of the elongated member.

7. The device as defined in claim 1 wherein the substance initially is water and, upon the water reaching the boiling point, seasoning and pasta may be added to the water in response to the audible signal being heard and cooked for a predetermined time period.

8. The device as defined in claim 7 wherein the simmer temperature is between 80° and 90° C.

9. The device as defined in claim 8 wherein the simmer temperature is 85° C.

10. The device as defined in claim 9 wherein the elongated member further comprises a strainer and a cover so that at the end of the predetermined time, water can be strained using the strainer from the elongated member and then the strainer removed to facilitate removal of the cooked pasta.

11. The device as defined in claim 4 wherein the elongated member, simmer sensor, heater and boiling temperature sensor form a first integral unit and the controller, input unit and power source form a second integral unit; and wherein the device further comprises a quick release from the first integral unit to the second integral unit.

12. The device as defined in claim 11 wherein the quick release connection has circular contacts to permit rotation of the first integral member with respect to the second integral member.

13. The device as defined in claim 12 wherein the second integral unit further comprises a display to permit a user to operate the device and input the predetermined time.

14. The device as defined in claim 3 wherein the heater further comprises a manual safety temperature sensor.

15. A method for cooking a substance, said method comprises:

placing the substance in an elongated member, said elongated member having a first end and a second end opposed from the first end, and, a heater for heating the substance at different power levels at the second end;

sensing a boiling of the substance with a boiling sensor;

sensing a temperature of the substance near the first end;

wherein once the substance is at a boiling temperature, which is higher than a simmer temperature, sending a simmer signal to a controller if the temperature sensed near the first end decreases below the simmer temperature, and, in response to receiving the simmer signal, the controller sends a simmer power level signal to the heater to cause the heater to heat the substance at a simmer power level; and ceasing sending the simmer signal to the controller if the temperature sensed near the first end increases above the simmer temperature, and, in response to ceasing to receive the simmer signal, the controller sends a simmer power level signal to the heater causing the heater to heat the substance at a non-simmer power level lower than the simmer power level.

16. A system for cooking a substance, said system comprising:

a first integral unit comprising:

an elongated member having a first end and a second end, opposed from the first end, for containing the substance;

a simmer sensor located near the first end of the elongated member for sending a simmer signal if the simmer sensor senses a decrease in temperature near the first end below a simmer temperature;

a heater located at the second end for heating the substance at different power levels;

a second integral unit comprising:

a controller for receiving signals including the simmer signal and sending power level signals to the heater;

a quick release for connecting the first integral unit to the second integral unit;

wherein once the substance is at a predetermined temperature, which is higher than the simmer temperature, the simmer sensor senses the temperature at the first end remote from the second end and sends the simmer signal to the controller if the temperature of the substance falls below the simmer temperature, and, in response to receiving the simmer signal, the controller sends a simmer power level signal to the heater to cause the heater to heat the substance at a simmer power level; and wherein, once the substance is cooked, the first integral unit can be separated from the second integral unit to facilitated removal of the substance from the elongated member.

17. The system as defined in claim 16 wherein the second integral unit further comprises:

an input unit for sending an activation signal, indicating activation of the device, and a predetermined simmer time signal, indicative of the time the substance is to be simmered, to the controller; and wherein, upon activation, the input unit sends the activation signal to the controller, and, in response to the controller receiving the activation signal, the controller sends a boil power level signal to the heater to cause the heater to heat the substance to boiling; and wherein once the controller receives a boiling point temperature signal indicating the substance is boiling, the controller sends the simmer power level signal to the heater based on the simmer signal from the simmer sensor for a period of time corresponding to the predetermined simmer time signal.

\* \* \* \* \*